United States Patent
Bath et al.

(10) Patent No.: US 6,241,424 B1
(45) Date of Patent: Jun. 5, 2001

(54) METHOD AND APPARATUS FOR REPLACING DAMAGED SECTION OF A SUBSEA PIPELINE WITHOUT LOSS OF PRODUCT OR ENTRY OF SEAWATER

(75) Inventors: William R. Bath, Cypress; Charles R. Yemington, Houston, both of TX (US)

(73) Assignee: Sonsub Inc., Houston, TX (US)

( * ) Notice: Subject to any disclaimer, the term of this patent is extended or adjusted under 35 U.S.C. 154(b) by 0 days.

(21) Appl. No.: 09/268,845

(22) Filed: Mar. 16, 1999

Related U.S. Application Data

(60) Provisional application No. 60/078,240, filed on Mar. 17, 1998.

(51) Int. Cl.[7] ............................. B08B 9/055; F16L 1/16
(52) U.S. Cl. .................... 405/156; 405/170; 15/104.061
(58) Field of Search .................... 405/154–156, 405/158, 166, 167, 170; 15/104.061, 104.062

(56) References Cited

U.S. PATENT DOCUMENTS

| | | | |
|---|---|---|---|
| 3,751,932 | * 8/1973 | Matthews, Jr. | 405/173 |
| 4,068,491 | * 1/1978 | Nobileau et al. | 405/156 |
| 4,155,669 | 5/1979 | Rochelle | 405/158 |
| 4,268,190 | * 5/1981 | Tesson | 405/154 X |
| 4,360,290 | * 11/1982 | Ward | 405/170 |
| 4,422,477 | * 12/1983 | Wittman et al. | 405/170 X |
| 4,465,104 | * 8/1984 | Wittman et al. | 405/170 X |
| 4,756,510 | * 7/1988 | Klamm et al. | 405/154 X |
| 4,856,937 | * 8/1989 | Grocott et al. | 405/154 |
| 4,875,615 | * 10/1989 | Savard | 228/119 |
| 4,917,539 | * 4/1990 | De La Salle | 405/154 |
| 5,044,827 | 9/1991 | Gray et al. | 405/173 |
| 5,293,905 | * 3/1994 | Friedrich | 138/89 |
| 5,425,599 | 6/1995 | Hall et al. | 405/158 |
| 5,458,439 | 10/1995 | Hall et al. | 405/158 |

\* cited by examiner

*Primary Examiner*—Eileen D. Lillis
*Assistant Examiner*—Tara L. Mayo
(74) *Attorney, Agent, or Firm*—Akin, Gump, Strauss, Hauer & Feld

(57) ABSTRACT

A method and apparatus for repairing a submerged pipeline. The method comprises installing a pair of hot tap tees on either side of the damaged section of pipeline, cutting a hole in the pipeline through each hot tap tee, inserting and securing plugging pigs into the pipeline, cutting and removing the damaged section of pipeline, and installing a new section of pipeline. The apparatus includes a plugging pig for use during repair of a damaged pipeline comprising a body shaft, a cup seal secured to the body shaft for engaging an interior wall of the pipeline, a cam attached to the exterior of the body shaft, a slip assembly for sliding on the cam and engaging a slip against the pipeline wall, and a control mechanism for engaging and releasing the slip from the wall.

25 Claims, 8 Drawing Sheets

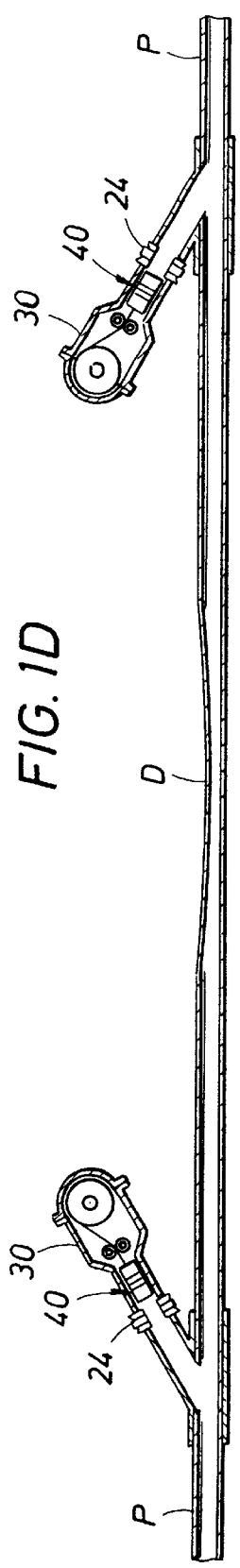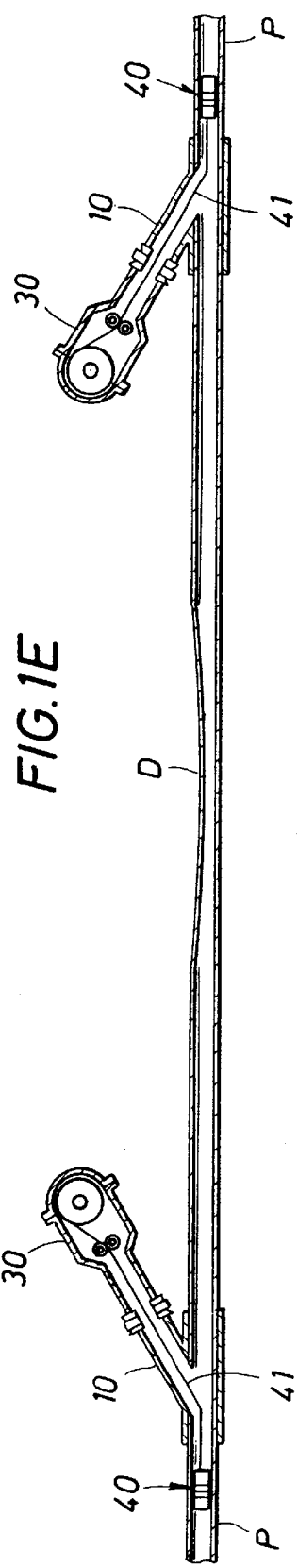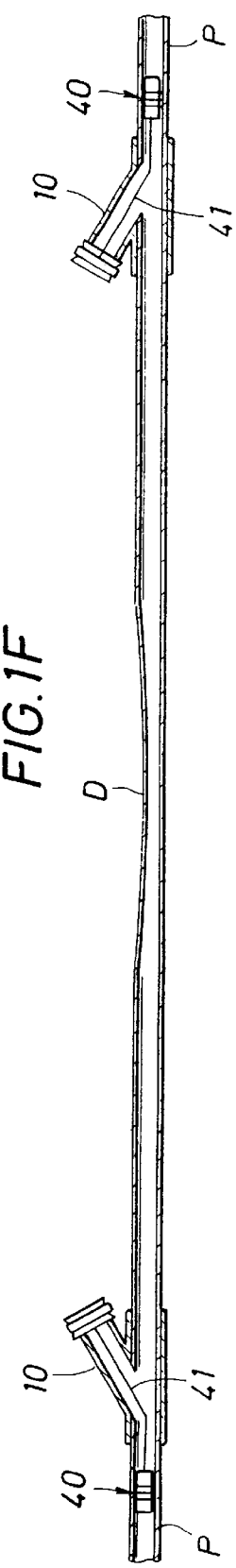

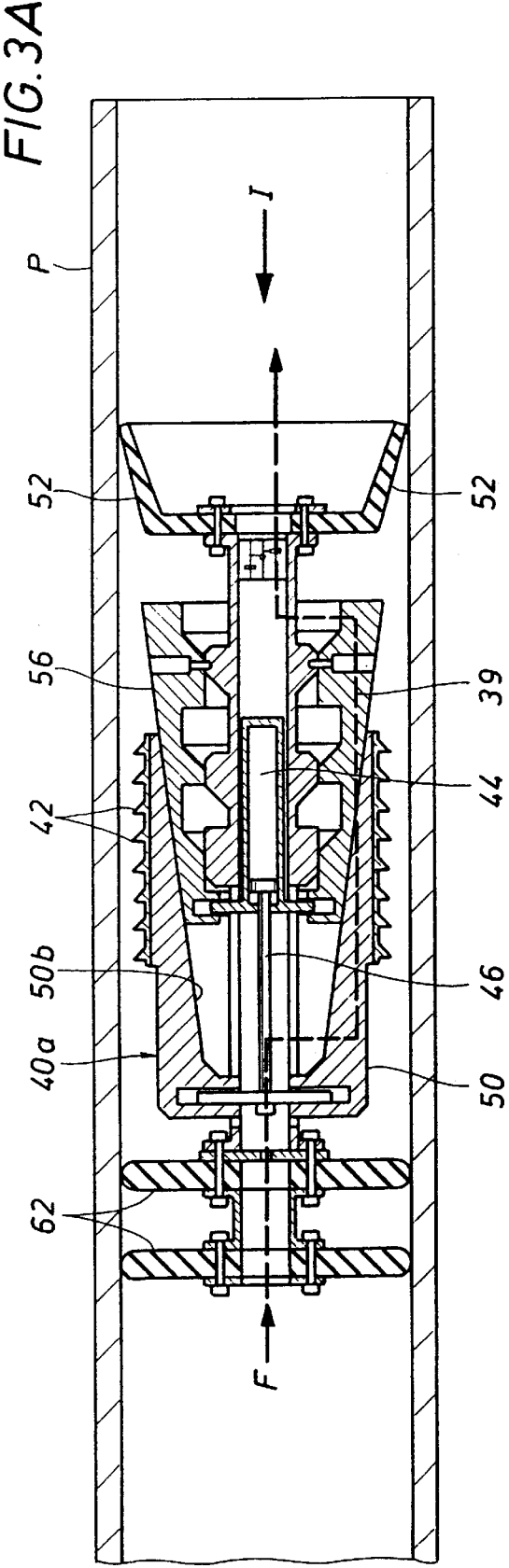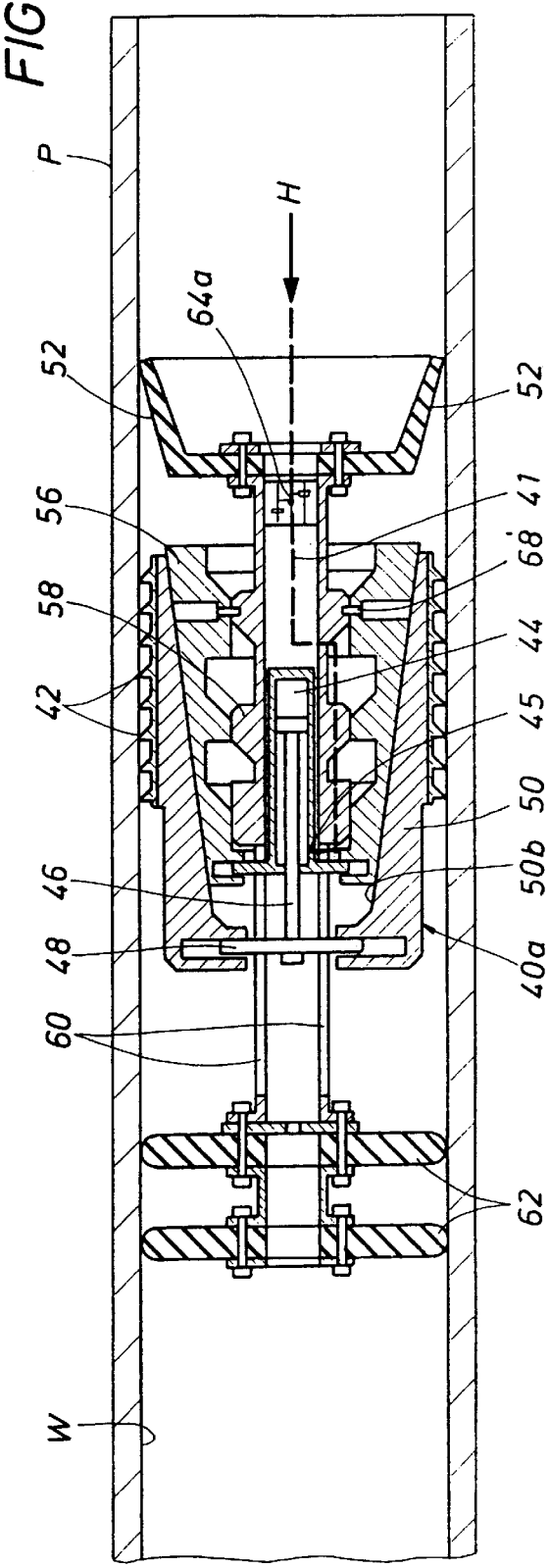

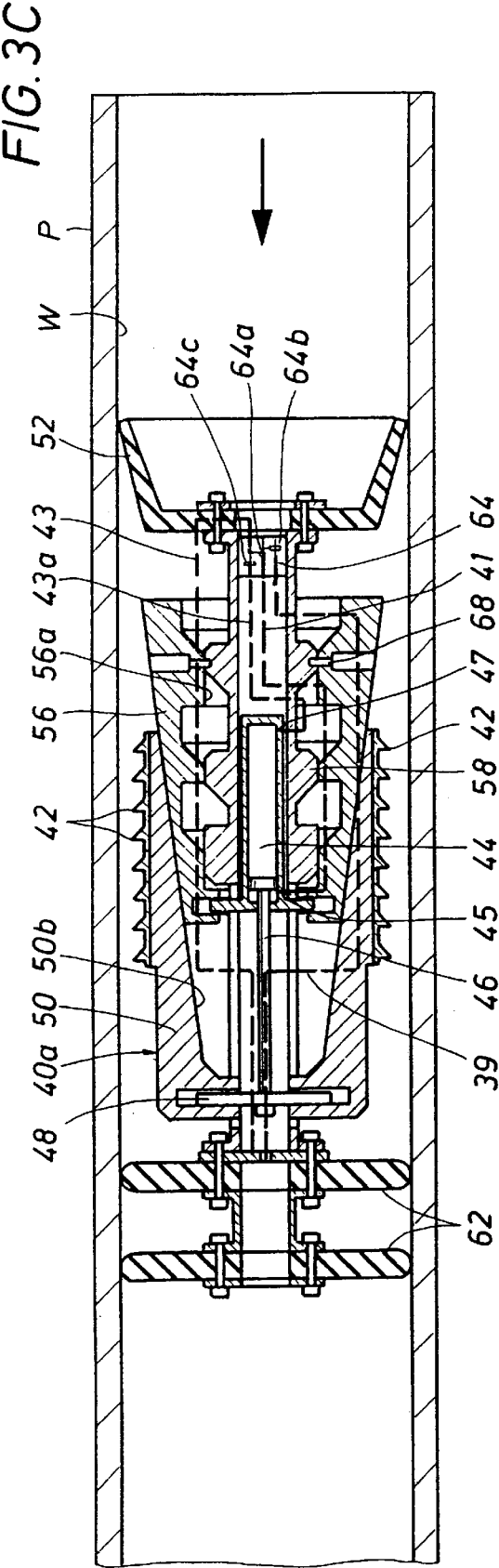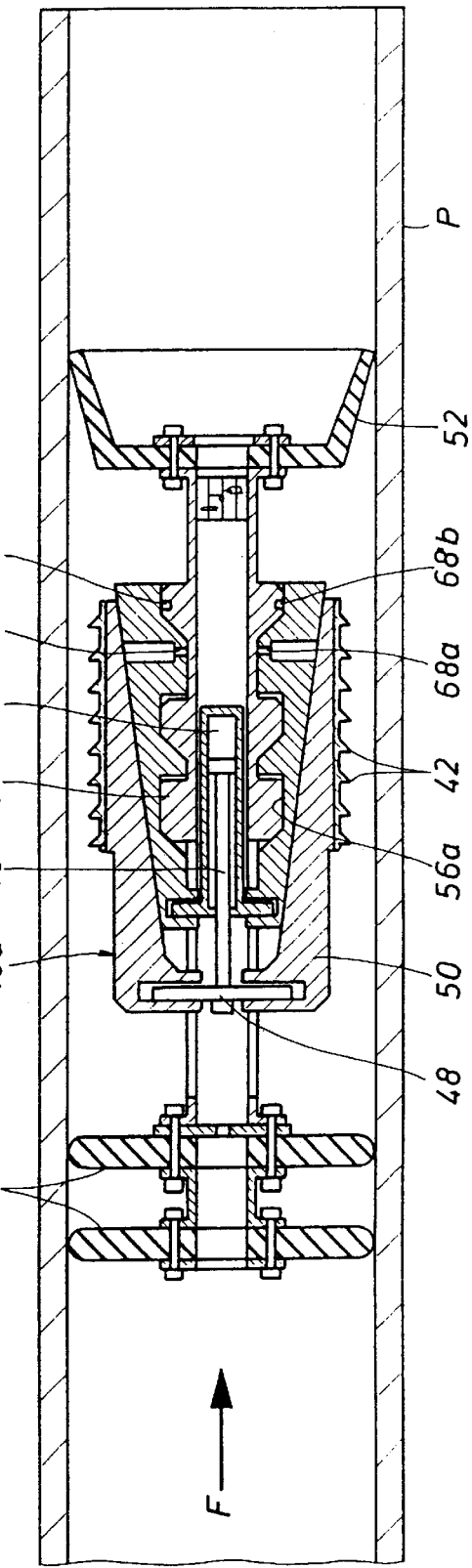

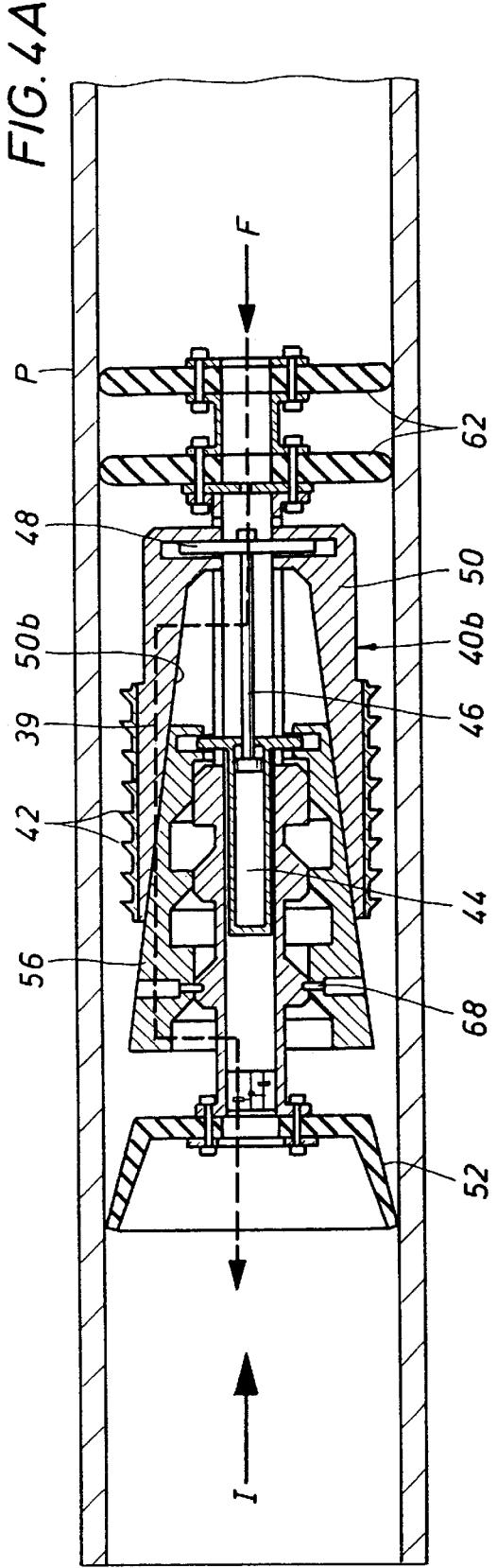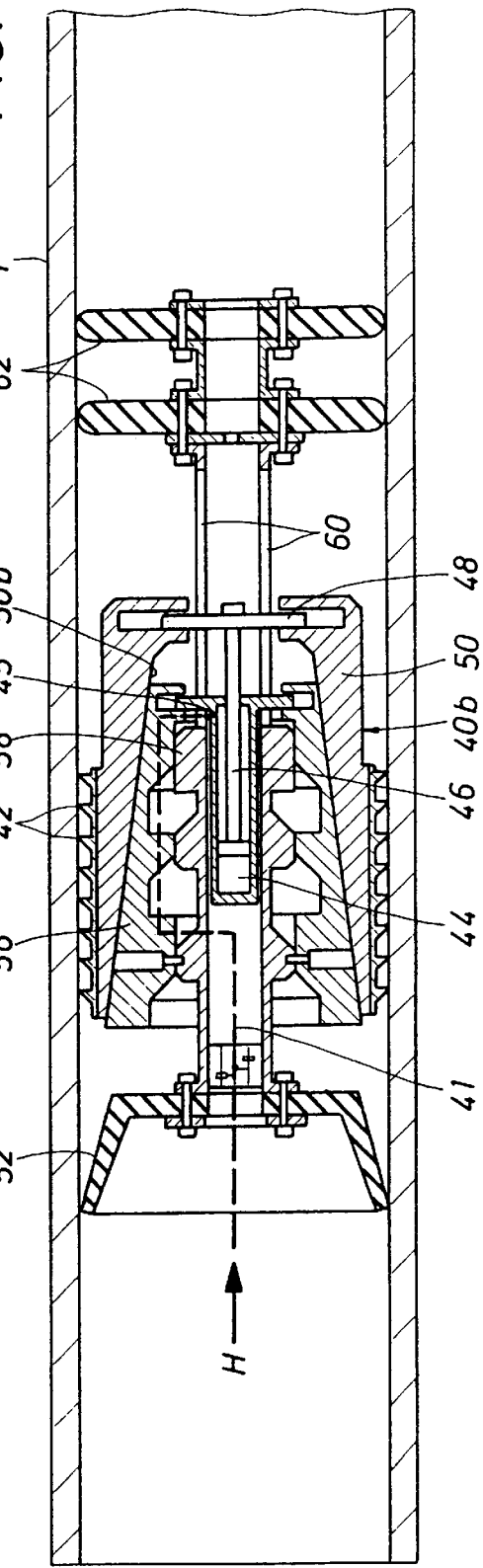

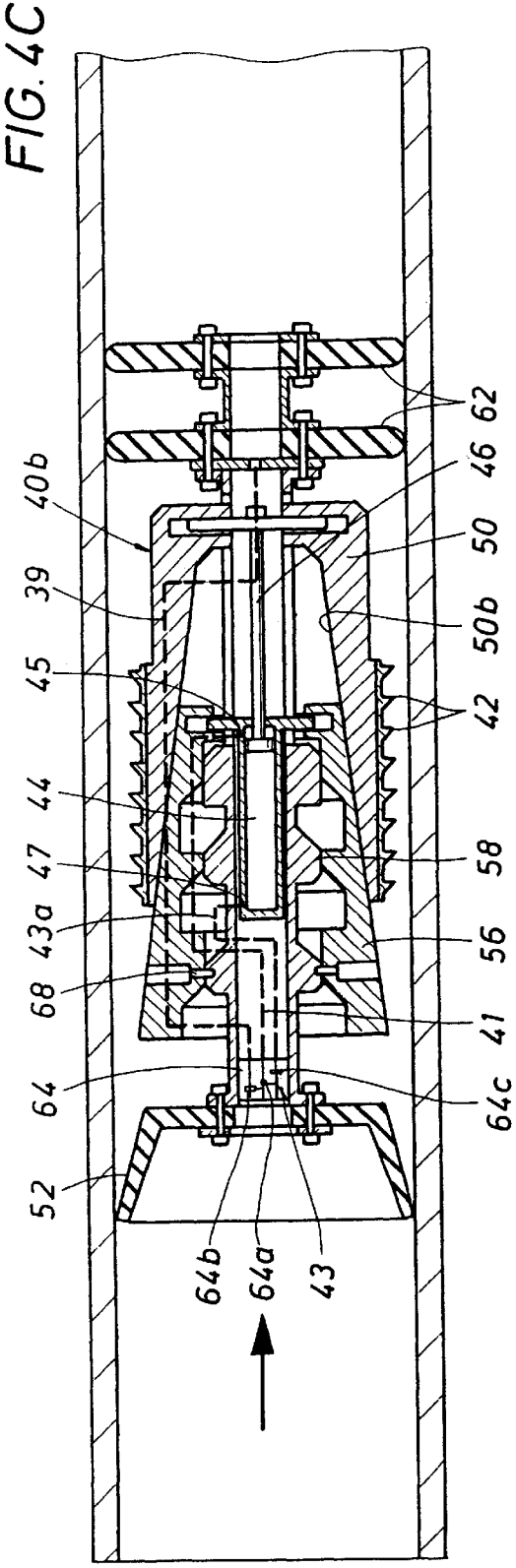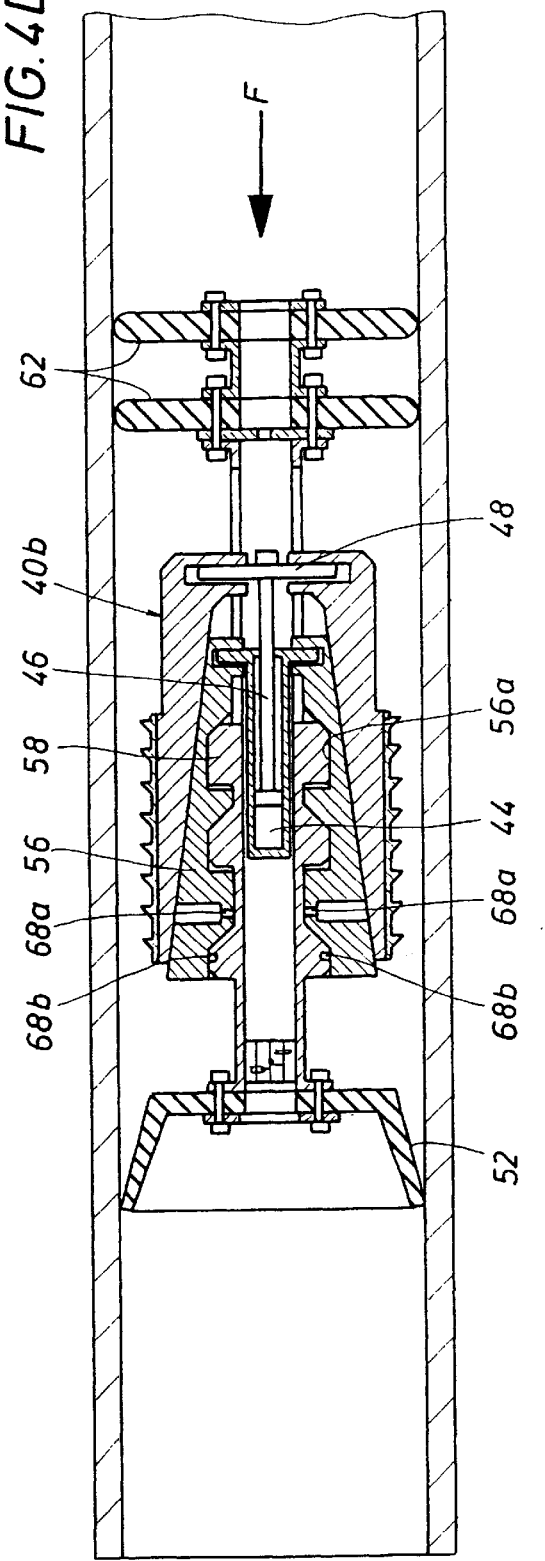

METHOD AND APPARATUS FOR REPLACING DAMAGED SECTION OF A SUBSEA PIPELINE WITHOUT LOSS OF PRODUCT OR ENTRY OF SEAWATER

This Appln claims the benefit of Provisional No. 60/078,240 filed Mar. 17, 1998.

BACKGROUND OF THE INVENTION

1. Field of the Invention

The present invention relates generally to a method and apparatus for repairing a submerged pipeline. In particular, the invention relates to a method and apparatus for replacing a damaged section of a submerged pipeline without a significant loss of product from or entry of seawater into the undamaged pipeline.

2. Description of the Related Art

Thousands of miles of pipeline lay on the seabed. Modern pipe laying technology permits the installation of pipelines in a variety of water depths, including water depths of thousands of feet. A serious problem results when damage occurs to a pipeline set in deep water because repair can be cumbersome and difficult. Typically. submerged pipelines are damaged by an object impacting it, by an anchor dragging across it, or by the environment corroding it. If a section of pipeline becomes significantly damaged, it may requirement replacement.

In the past, generally two methods were employed to repair a damaged submerged pipeline. One method required the damaged section of the pipeline to be recovered to the water surface for repair on the deck of a large surface vessel. After the repair was completed, the pipeline was lowered and repositioned on the seabed. A disadvantage of this method included the expense associated with recovering the pipeline to the surface. Another disadvantage with this method was that it typically could only be used with small diameter pipelines in relatively shallow water.

A second method for repairing a damaged pipeline involved cutting the pipeline into two pieces near the damaged section while the pipeline remained on the seabed. The cut end of each pipe section was pulled to the surface. Once at the surface, the damaged section of pipeline was replaced with a new section. Specially designed connectors gripped the pipe at the cut ends and provided a flange or collet hub that could be used to connect the new section to the pipeline. Often, a third connector was used to make a telescoping spool section that could be expanded between the two cut ends of the pipeline to facilitate the connection. A disadvantage of this method was that product could escape from the pipeline to the subsea environment and seawater could enter into the pipeline.

To prevent product from escaping into the environment from the cut pipeline, hot tapping systems were used to plug the pipeline. In general, hot tapping systems use a clamp-on, split tee to provide a fluid tight connection in the pipeline. A special drill was attached to the tee in a manner that prevents loss of pipeline fluid during the tapping operation. The tapping drill was fitted with a special cutter that opened a full diameter hole in the side of the pipeline. After cutting a hole in the pipeline, a stopper machine replaced the drill. The stopper machine installed an elastomeric stopper into the pipeline. After the new pipeline section was attached to the remaining pipeline, the stopper was removed but the tee became a permanent part of the pipeline.

A disadvantage of the hot tapping and stopper method was that although the hot tap tee typically could seal under fill pipeline pressure, the tee needed to provide a structural tension capacity to make up for the removal of half of the pipe wall, which was cut away during installation of the stopper. The need for structural capacity demanded that a mechanical connection be made to the pipeline which could withstand full line pressure.

Another disadvantage of the hot tapping system was that the opening in the side of the pipe presented a hazard to the passage of a pipeline pig. The opening needed to be protected with bars or plates such that a pipeline pig did not catch on the opening. Eliminating this hazard was typically cumbersome and complicated in deepwater where repairs are usually performed by an ROV.

SUMMARY OF THE INVENTION

The present invention includes a method and apparatus for replacing a damaged section of a subsea pipeline setting on the seabed. The present invention prevents the product in the pipeline from escaping to the environment and the seawater from entering into the pipeline when the damaged section of pipeline is removed from the pipeline. Additionally, the method and apparatus of the present invention, which uses hot tap tees for the installation of plugging pigs, allows for the removal of the hot tap tees from the repaired pipeline.

The method includes installing a pair of hot tap tees on either side of the damaged section of pipeline. An angle-cutting drilling machine attaches to each of the hot tap tees and each drilling machine cuts a hole into the pipeline. After cutting the holes, the drilling machines are removed from the hot tap tees and a pig-set machine is installed on each of the hot tap tees. A plugging pig according to the present invention is inserted by the pig-set machines through each of the hot tap tees and into the pipeline. The plugging pigs are secured in place within the pipeline. A cutting device is lowered to the seabed and the pipeline is cut at two locations, each location being between the hot tap tee and the installed plugging pig. The damaged section of pipeline, which includes the hot tap tees, is removed and replaced by a new section of pipeline.

The present invention also includes a method for controlling a plugging pig inserted into a pipeline through a hot tap tee. The method comprises energizing a lock mechanism within the plugging pig to engage a slip on the lock mechanism with the interior wall of the pipeline. The fluid pressure in the pipeline is monitored and the slips are released when the fluid pressure reaches a predetermined pressure.

The present invention also includes a plugging pig apparatus inserted through a hot tap tee to prevent the loss of product from a cut pipeline. The apparatus includes a body shaft having an external surface and an internal cavity. A cup seal is mounted to the body shaft and engages an interior wall of the pipeline. A cam is attached to said external surface of the body shaft and a slip assembly slides on the cam to engage a slip with the interior wall. A control mechanism controls the engagement and release of the slip from the interior wall.

BRIEF DESCRIPTION OF THE DRAWINGS

A better understanding of the present invention may be had by reference to the following drawings and contained numerals therein of which:

FIGS. 1A–1I are side elevational views of the method and apparatus for replacing a damaged section of pipeline according to the present invention;

FIGS. 3A–3D are side elevational views, partially in section, of the operation of the upstream plugging pig of the present invention;

FIGS. 4A–4D are side elevational views, partially in section, of the operation of the downstream plugging pig of the present invention.

DETAILED DESCRIPTION OF INVENTION

Figure 1A:
Figure 1B:
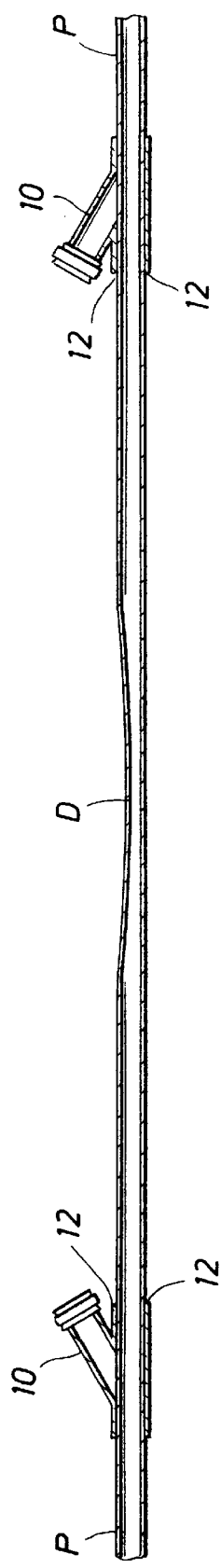

The present invention relates to a method and apparatus for repairing a damaged section of a submerged pipeline. Referring to FIG. 1A, once a damaged section D of a pipeline P is located, the pipeline pressure is reduced to less than the ambient seawater pressure at the depth of the repair. The flow in the pipeline P is shut off at the well head or production point (not shown). Using conventional methods, hot tap tees 10 with angled outlets are installed on either side of the damaged section D (FIG. 1B). The hot tap tees 10 are fitted with simple elastomeric seals 12 rated for the seawater depth of the repair. Structural capacity tees are not required because the tees will not be used at full pipeline pressure.

Figure 1C:
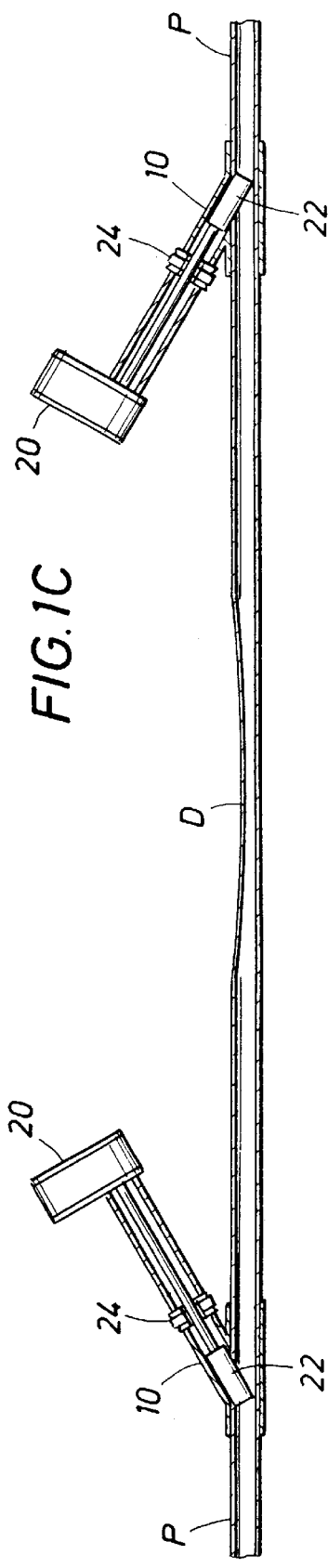

As shown in FIG. 1C, angle-cutting drilling machines 20 are installed on the tees 10 and full diameter holes are cut into the pipeline by a drill bit 22. Referring to FIG. 1D, the angle-cutting machines 20 are removed from the tees 10 and pig-set machines 30 are installed on the tees 10. Fluid in the pipeline P is contained during installation of the pig-set machines 30 by containment valves 24 mounted between the tees 10 and the pig-set machines 30.

Figure 2:
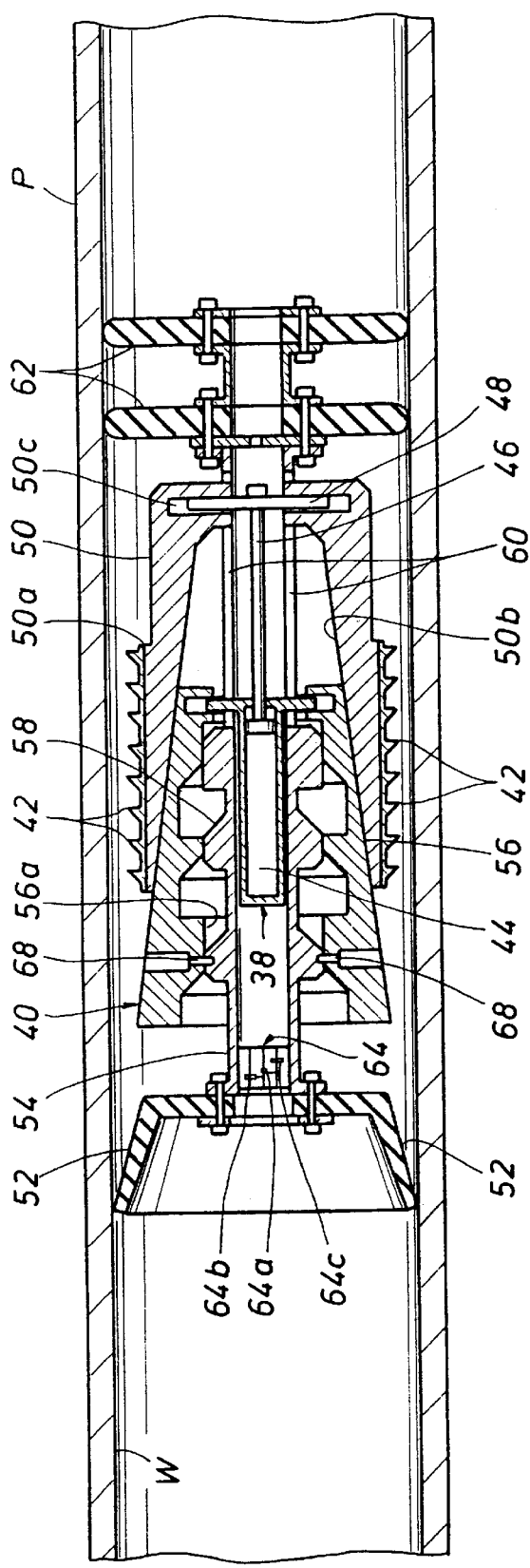
FIG. 2 is a sectional elevational view of a plugging pig assembly according to the present invention.

As shown in FIG. 1E, the pig-set machines 30 insert plugging pigs 40 according to the present invention into the pipeline P. As shown in FIG. 2, and described in greater detail below, the plugging pigs 40 are fitted with locking devices or slips 42 that hold the pigs 40 in position within the pipeline P against the pressure of the surrounding seawater. Referring to FIGS. 1E and 2, slips 42 can be connected by a hydraulic hose 41 extending through the hot tap tee 10 to a pressure connection (not shown) on the outside of the pig-set machine 30. Hydraulic pressure from an external pump (not shown) is applied to the pressure connection to extend the slips 42 on the pigs 40 such that the slips 42 are forced against an inside wall W of the pipeline P. A check valve 64a of a valve circuit 64 holds the slips 42 in engagement with the interior wall W after the external pump is no longer in communication with the pigs 40. The damaged section D is now isolated from the pipeline P by the plugging pigs 40.

Alternatively, a plugging pig without a locking device or slips may be used in the present invention. If the pipeline fluid conditions are such that the differential pressure between the pipeline fluid and the surrounding seawater can be maintained such that the pig is neither expelled from the pipeline nor driven too far into the pipeline, then non-locking pigs can be used instead of locking pigs 40. Similarly, if large amounts of seawater, trapped between the pigs during the repair, are acceptable in the pipeline once the repair is completed then non-locking pigs can be secured within the pipeline with the method of the present invention. Large differences in differential pressure or compressible fluids in the pipeline, however, can drive non-locking pigs great distances before equilibrium is established and the pigs become secured within the pipeline.

After the plugging pigs 40 are installed in the pipeline P, the pig-set machines 30 can be removed from the hot tap tees 10 (FIG. 1F). If desired, the damaged section D of the pipeline P can be purged to remove any pipeline fluid trapped between the pigs 40. This action removes product which might otherwise escape to the environment during the cutting operation.

Figure 1G:
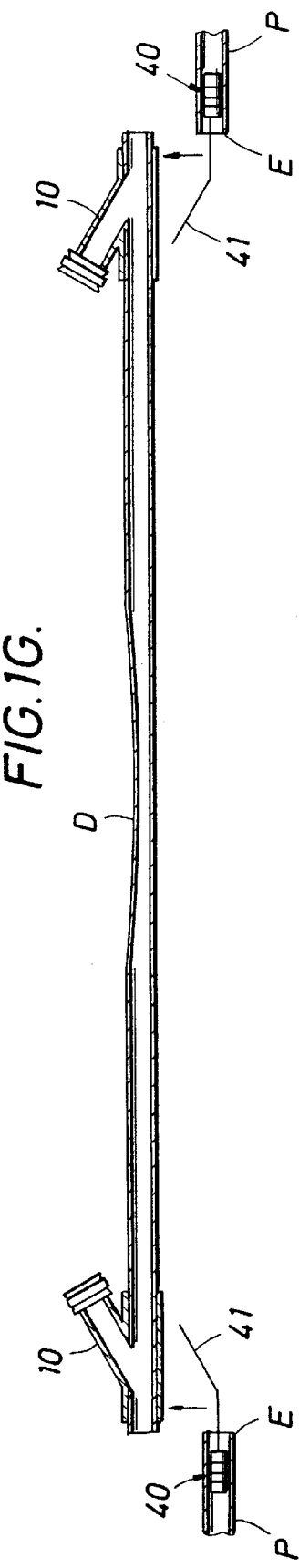

Referring to FIG. 1G, a saw or similar device (not shown) is then used to cut out the damaged section D of the pipeline P between the hot tap tees 10 and the plugging pigs 40. This action exposes the interior of the damaged section D to ambient seawater pressure. The cutting device also cuts the hoses 41 connecting the plugging pigs 40 to the pig-set machines 30. When the pipeline P is completely severed, the damaged section D, the hot tap tees 10, and the pig-set machines 30 may be recovered to the surface. Similarly, if the pipeline P is to be lifted to the surface for installation of pipe end connections (not shown), the plugging pigs 40 prevent the loss of product. Furthermore, because the hot tap tees 10 have been removed, the pipeline's P cut ends E and can withstand the forces of lifting the pipeline P.

Figure 1H:
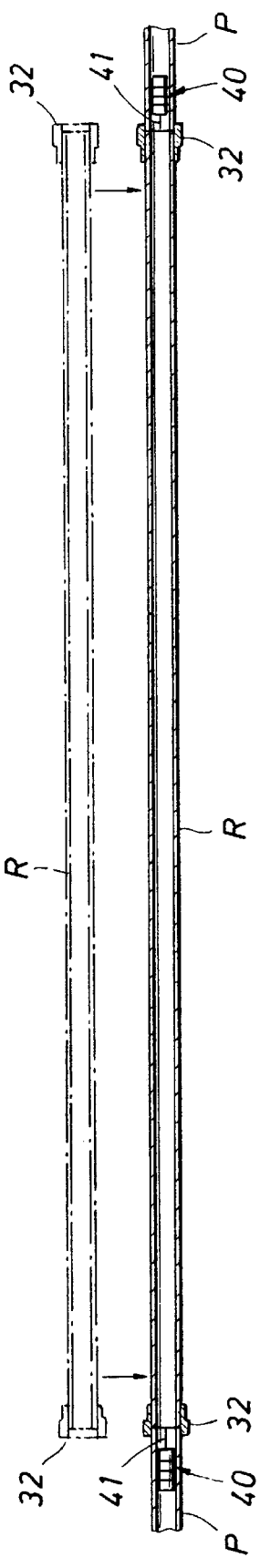

Referring to FIG. 1H, if the repair is to be performed subsea, the hydraulic hose 41 can be cut away from the plugging pigs 40 to avoid any interference with installation of a new pipeline section R. If desired, the cut ends E of the pipeline can be cleaned or prepared as necessary to receive pipeline connectors 32. The cut ends E of the pipeline P are measured and surveyed to determine the proper length and shape of the new section R. On the surface vessel, the new pipeline section R is cut and shaped as needed to match the cut ends E of the pipeline P. The pipeline end connectors 32 are installed on the new section R and the new section R is lowered to the seafloor and installed in the pipeline P.

Figure 1I:
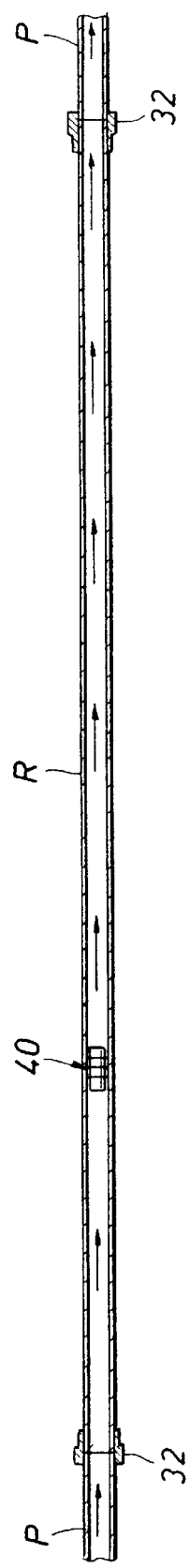

After the new section R is installed, pipeline pressure is restored in the pipeline P. As shown in FIG. 1I, the action of raising the pipeline pressure releases the plugging pigs 40. The pigs 40 are then pumped through the pipeline P carrying any seawater, trapped between the pigs 40 during installation of the new section R, to the pig receiver (not shown). At the pig receiver, the plugging pigs 40 are removed and the pipeline P is returned to service.

In the preferred method of the present invention, the plugging pig 40 shown in FIG. 2 is used to prevent product in the pipeline P from escaping to the underwater environment. The plugging pig 40 includes conventional cup seals 52, made of an elastomeric material, for sealing the product within the pipe P and for preventing the seawater from entering the pipeline P. The cup seals 52 are attached to a body shaft 54 and fit tightly against the interior wall W of pipeline P. Plate seals 62, preferably made of an elastomeric material, are connected to the body shaft 54 through a guide 60. The plate seals 62 also contact the interior wall W and provide a means for centering the pig 40 within the pipeline P.

A locking mechanism 38 includes the body shaft 54 with a piston cylinder 44 in its interior and a secondary release cam 58 on its exterior. Within the cylinder 44 is a cylinder rod 46 which can be extended and retracted by the cylinder 44. A cam 56 is secured to the secondary release cam 58 by a shear pin 68.

An actuator plate 48 is attached to the rod 46 and translates along the guides 60 as the rod 46 extends and retracts. As the rod 46 moves, the plate 48 causes an actuator follower 50b of an actuator assembly 50 to slide along the cam 56. The actuator plate 48 moves within a slot 50c when the rod 46 translates. An outer surface 50a of the actuator assembly 50 includes slips 42.

A valve assembly 64 is also secured within the body shaft 54. The valve assembly 64 includes the check valve 64a, a bypass valve 64b, and a burst disk 64c.

Referring to FIGS. 3A and 4A, the upstream and downstream plugging pigs 40a and 40b, respectively, include the same internal components as shown in FIG. 2. The engagement with and subsequent release from the interior wall W, however, requires the components to operate differently to resist the seawater pressure against the individual pigs 40a and 40b. Both pigs 40a and 40b use plate seals 62 and cup seals 52 for containment of the pipeline fluids and for travel through the pipeline P. The locking mechanism 38 that engages the slips 42 against the inside wall W of the pipeline P is the same for both the upstream and downstream pigs. Moreover, both pigs use the hydraulic cylinder 44 and the rod 46 to extend and retract the slips 42. The slips 42 are curved and arranged to match the inside diameter of the pipeline P. The engagement face of each slip 42 element is selected to match the material and design of the pipeline P.

The difference between the upstream and downstream pigs 40a and 40b is in the control of the locking mechanism 38. As shown in FIG. 3A, the upstream pig 40a is inserted into the pipeline P in the direction of arrow I. Referring to FIG. 3B, a rod end port 45 is connected by the hydraulic hose 41 to a pressure connection on the outside of the pig-set machine 30. Hydraulic fluid travels through the hose 41 and the port 45 to retract the rod 46 of the cylinder 44 and force the slips 42 to engage the interior wall W of the pipeline P.

As described above, the slips 42 are mounted on the actuator assembly 50 which slides along the cam 56. Thus, movement of the pig 40a in the upstream direction (the direction of the arrow I) increases the force of the slips 42 against the interior wall W. The check valve 64a in the valve assembly 64 prevents the cylinder 44 from retracting after the hydraulic pressure is removed. Alternately, an overcenter mechanism could be used to prevent the cylinder from retracting.

Figure 5:
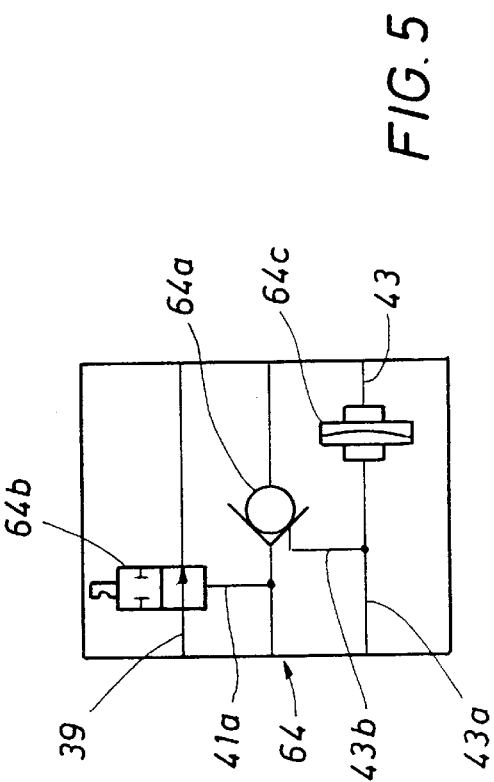
FIG. 5 is an elevational view, partially in section, of a valve assembly used in the plugging pigs of the present invention.

As shown in FIG. 5, the hydraulic hose 41 of the valve assembly 64 is connected hydraulically through a conduit 41a to the bypass valve 64b which allows pipeline fluid F to pass through a fluid line 39 of the pig 40a during installation (FIG. 3A). The bypass valve 64b and the fluid line 39 prevent hydraulic lock from forming in the pipeline P that would otherwise prevent insertion of the plugging pig 40. The bypass valve 64b is closed by hydraulic pressure in the hose 41 and the conduit 41 a at the same time that slips 42 are extended against the wall W. The bypass valve 64b remains closed during the repair of the pipeline P.

Referring to FIGS. 3C and 5, after the new pipeline section R is installed, pressure in a monitor line 43 on the upstream side of the pig 40a is increased to release the slips 42. Alternatively, a remote (acoustic or other) signal and an energy storage device on the pig could be used to release the slips. To release the slips 42, a piston end port 47 is hydraulically connected to the burst disk 64c through a hydraulic line 43a and when the upstream pressure in the pipeline P and the monitor line 43 exceeds the burst pressure of the burst disk 64c, the disk 64c breaks and allows the pipeline pressure to extend the rod 46 and release the slips 42. Fluid from the pipeline P flows through the hydraulic line 43a and the port 47 into the cylinder 44 causing the rod 46 to translate and the actuator follower 50b to slide along the cam 56. The fluid pressure now in line 43a communicates with the check valve 64a through a conduit 43b to open the check valve 64a Once the check valve 64a is opened, the hydraulic fluid that was pumped into the cylinder 44 through the port 45 and the hose 41 can exit through the port 45 and the hose 41.

The difference in forces between the rod end and the piston end of the cylinder 44 keeps the slips 42 released as the pig travels through the pipeline P. The pig 40a is now free to travel with the pipeline fluid flow. As the pig moves forward, it pressurizes the seawater in the new pipeline section. This action raises the pressure on the upstream side of the downstream pig 40b (FIGS. 1H, 1I, and 4A). The ratio of the cylinder rod to the piston diameter is selected such that the pressure in the new pipeline section R, created by upstream pressure on the upstream pig 40a, is sufficient to release the downstream pig 40b.

Referring to FIGS. 4A–4C, the downstream pig 40b control system is configured slightly differently from the upstream pig 40a. As shown in FIG. 4A, the downstream pig 40b is inserted into the pipeline P in the direction of arrow I. The direction of the arrow I is downstream. In the downstream pig 40b, the hydraulic hose 41 on the upstream side of the pig 40b is connected to the rod end port 45 and as hydraulic pressure increases in the hose 41 the rod 46 retracts into the cylinder 44 and the slips 42 engage the wall W of the pipeline P. The slips 42 are mounted on the actuator assembly 50 which slides along the cam 56. Thus, the movement of the pig in the downstream direction increases the force of the slips 42 against the pipeline wall W. The bypass valve 64b prevents a hydraulic lock during installation by permitting fluid F to escape from the pipeline P.

The burst disk 64c is connected to the piston end port 47 on the upstream side of the pig 40b. When fluid pressure D in the new pipeline section R is raised by the movement and pressure driving the upstream pig 40a, the burst disk 64c breaks and allows pipeline fluid pressure D to operate the cylinder 44 and release the slips 42. The hydraulic fluid within the cylinder 44 escapes through port 45 while fluid enters into port 47. The burst pressure of the disk is significantly higher than ambient seawater pressure to prevent inadvertent release of the pig slips 42. As the pigs 40a and 40b are driven into the pipeline P, the downstream pressure increases and the pressure differential across the pig decreases to that required to drive the pig. The differential areas of the cylinder piston and rod are therefore selected to maintain retraction of the slips during this condition.

As a contingency against failure of the cylinder 44 to release the slips 42, a secondary slip release mechanism can be incorporated into each pig 40a and 40b. Referring to FIGS. 3D and 4D, the secondary release mechanism can be operated by pressurizing the upstream side of the upstream pig 40a with the fluid F and pressurizing the downstream side of the downstream pig 40b with the fluid F. The operation of the secondary release is the same in either case. If the plugging pig slips 42 fail to release, the pressure in the pipeline P is increased to a point where the pigs 40 will begin to move. Prior to reaching that pressure point, however, the shear pins 68 break and allow the release cam follower 56a of the cam 56 to slide along the release cam 58. The cam follower 56a eventually collapses into notches of the secondary release cam 58. Once the cam 56 has collapsed within release cam 58, the slips 42 are no longer in contact with the wall W and the pigs 40 are free to move within the pipeline P.

The foregoing disclosure and description of the invention are illustrative and explanatory thereof, and various changes in the details of the illustrated apparatus and construction and method of operation may be made without departing from the spirit of the invention.

What is claimed is:

1. A method for replacing a damaged section of subsea pipeline setting on the seabed, the method comprising the steps of:

installing a first and a second hot tap tee on a subsea pipeline such that each tee is positioned astride the pipeline with one hot tan tee on each side of the damaged pipeline section;

cutting a hole into the subsea pipeline through each hot tap tee;

inserting a first plugging pig through the first hot tap tee and into the pipeline with a pig-set machine;

inserting a second plugging pig through the second hot tap tee and into the pipeline;

securing the plugging pigs within the pipeline;

cutting the pipeline at a first location between the first plugging pig and the first hot tap tee with a cutting device to form a first pipe end;

cutting the pipeline at a second location between the second plugging pig and the second hot tap tee with the cutting device to form a second pipe end;

removing the damaged section of the subsea pipeline which includes the hot tap tees; and installing a new section of pipeline between the first and second pipeline ends.

2. The method for replacing a damaged section of subsea pipeline according to claim 1, wherein said step of installing a new section of pipeline includes:

attaching a pipe end recovery fitting to each of the pipeline ends;

securing a hoist from a surface vessel to each recovery fitting;

lifting the first and second pipeline ends to the surface vessel with the hoist;

installing the new section of pipeline between the first and second pipeline ends; and lowering the pipeline to the seabed.

3. The method for replacing a damaged section of subsea pipeline according to claim 1, wherein said step of securing the plugging pigs within the pipeline is accomplished by expanding slips on the plugging pigs to engage an inside wall of the pipeline.

4. The method for replacing a damaged section of subsea pipeline according to claim 3, wherein said step of expanding slips of the plugging pigs is accomplished by energizing a piston assembly through an external hydraulic line extending from an external pump.

5. The method for replacing a damaged section of subsea pipeline according to claim 1, wherein said step of installing a new section of pipeline includes unlocking the plugging pigs from within the pipeline.

6. The method for replacing a damaged section of subsea pipeline according to claim 5, wherein said step of unlocking the plugging pigs is accomplished by manipulating fluid pressure within the pipeline.

7. The method for replacing a damaged section of subsea pipeline according to claim 5, wherein said step of installing a new section of pipeline includes pumping the plugging pigs through the pipeline to a discharge end.

8. The method for replacing a damaged section of subsea pipeline according to claim 7, wherein said step of installing a new section of pipeline includes containing a substantial portion of any seawater included between the plugging pigs.

9. A method for controlling a plugging pig inserted into a pipeline through a hot tap tee to prevent the loss of product from the pipeline during replacement of a damaged section of subsea pipeline, the method comprising the steps of:

energizing a hydraulically lock mechanism within the plugging pig;

engaging a slip of the lock mechanism with an interior wall of the pipeline;

monitoring fluid pressure within the pipeline through the pressurization of a burst disk;

releasing the slip from the wall of the pipeline when the fluid pressure within the pipeline reaches a predetermined pressure; and pumping the plugging pig through the pipeline once the slip has been released from the wall.

10. The method for controlling a plugging pig inserted into a pipeline through a hot tap tee according to claim 9, wherein said step of engaging the slip with an interior wall is accomplished by sliding the slip over a cam mechanism of the plugging pig.

11. The method for controlling a plugging pig inserted into a pipeline through a hot tap tee according to claim 10, wherein said step of sliding the slip over the cam is accomplished by actuating a cylinder rod within a cylinder of the plugging pig.

12. The method for controlling a plugging pig inserted into a pipeline through a hot tap tee according to claim 11, wherein said step of actuating the cylinder is accomplished by actuating a cylinder within the plugging pig with an external hydraulic hose inserted through the hot tap tee.

13. The method for controlling a plugging pig inserted into a pipeline through a hot tap tee according to claim 9, wherein said step of releasing the slip from the wall is accomplished by bursting a burst disk and de-energizing the lock mechanism.

14. A plugging pig apparatus adapted to be inserted through a hot tap tee for preventing a loss of product from a cut pipeline during a repair of a damaged section of pipeline, the apparatus comprising:

a body shaft having an external surface and an internal cavity;

a cup seal secured to said body shaft and adapted to engage an interior wall of the pipeline;

a cam attached to said external surface of said body shaft;

a slip assembly for sliding on said cam and engaging a slip against the wall of the pipeline; and a control mechanism within the plugging pig apparatus for hydraulically engaging said slip to the wall and for releasing said slip from the wall said control mechanism including a burst disk for monitoring fluid pressure contained within the pipeline and releasing said slip from engagement when the fluid pressure breaks said disk.

15. The plugging pig apparatus according to claim 14, wherein said control mechanism includes a check valve for preventing said slip from disengaging the wall.

16. The plugging pig apparatus according to claim 14, further including a hydraulic cylinder mounted within said internal cavity, said cylinder including a rod therein for sliding said slip assembly on said cam.

17. The plugging pig apparatus according to claim 14, further including a second cam on top of said cam wherein said second cam is secured by shear pins.

18. A plugging pig apparatus adapted to be inserted through a hot tap tee for preventing a loss of product from a cut pipeline during a repair of a damaged section of pipeline, the apparatus comprising:

a body shaft having an external surface and an internal cavity;

a cup seal secured to said body shaft and adapted to engage an interior wall of the pipeline;

a bypass valve secured within said body shaft for permitting fluid to pass through the plugging pig apparatus during installation;

a cam attached to said external surface of said body shaft;

a slip assembly for sliding on said cam and engaging a slip against the wall of the pipeline; and a control mechanism within the plugging pig apparatus for engaging and releasing said slip from the wall, said control mechanism including a bypass valve control mechanism for closing said bypass valve.

19. The plugging pig apparatus according to claim 18, wherein said control mechanism includes a burst disk for monitoring fluid pressure contained within the pipeline and releasing said slip from engagement when the fluid pressure breaks said disk.

20. The plugging pig apparatus according to claim 18, wherein said control mechanism includes a check valve for preventing said slip from disengaging the wall.

21. The plugging pig apparatus according to claim 18, further including a hydraulic cylinder mounted within said internal cavity, said cylinder including a rod therein for sliding said slip assembly on said cam.

22. The plugging pig apparatus according to claim 18, wherein said bypass valve control mechanism includes a pressurized hydraulic line.

23. A plugging pig apparatus inserted through a hot tap tee for preventing a loss of product from a cut pipeline during a repair of a damaged section of pipeline, the apparatus comprising:

a body shaft having an external surface and an internal cavity;

a cup seal secured to said body shaft and adapted to engage an interior wall of the pipeline;

a cam attached to said external surface of said body shaft;

a slip assembly for sliding on said cam and engaging a slip against the wall of the pipeline; and a control mechanism within said plugging pig for engaging and releasing said slip from the wall, said control mechanism including a check valve for preventing said slips from disengaging the wall.

24. A plugging pig apparatus inserted through a hot tap tee for preventing a loss of product from a cut pipeline during a repair of a damaged section of pipeline, the apparatus comprising:

a body shaft having an external surface and an internal cavity;

a cup seal secured to said body shaft and adapted to engage an interior wall of the pipeline;

a first cam attached to said external surface of said body shaft;

a second cam on top of said first cam, said second cam being secured by shear pins to said first cam;

a slip assembly for sliding on said first cam and engaging a slip against the wall of the pipeline; and a control mechanism within said plugging pig for engaging and releasing said slip from the wall.

25. A method for controlling a plugging pig inserted into a pipeline through a hot tap tee to prevent the loss of product from the pipeline during replacement of a damaged section of subsea pipeline, the method comprising the steps of:

hydraulically energizing a lock mechanism within the plugging pig;

engaging a slip of the lock mechanism with an interior wall of the pipeline;

monitoring fluid pressure within the pipeline;

releasing the slip from the wall of the pipeline when the fluid pressure within the pipeline reaches a predetermined pressure bursting a burst disk and de-energizing the lock mechanism; and pumping the plugging pig through the pipeline once the slip has been released from the wall.

* * * * *